Oct. 19, 1948.  B. G. OLVING  2,451,508
AUTOMATIC ELECTRIC TOASTER
Filed Nov. 22, 1944  5 Sheets-Sheet 1
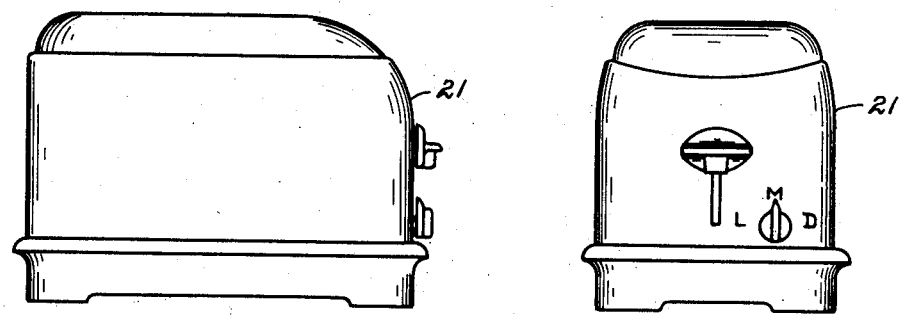
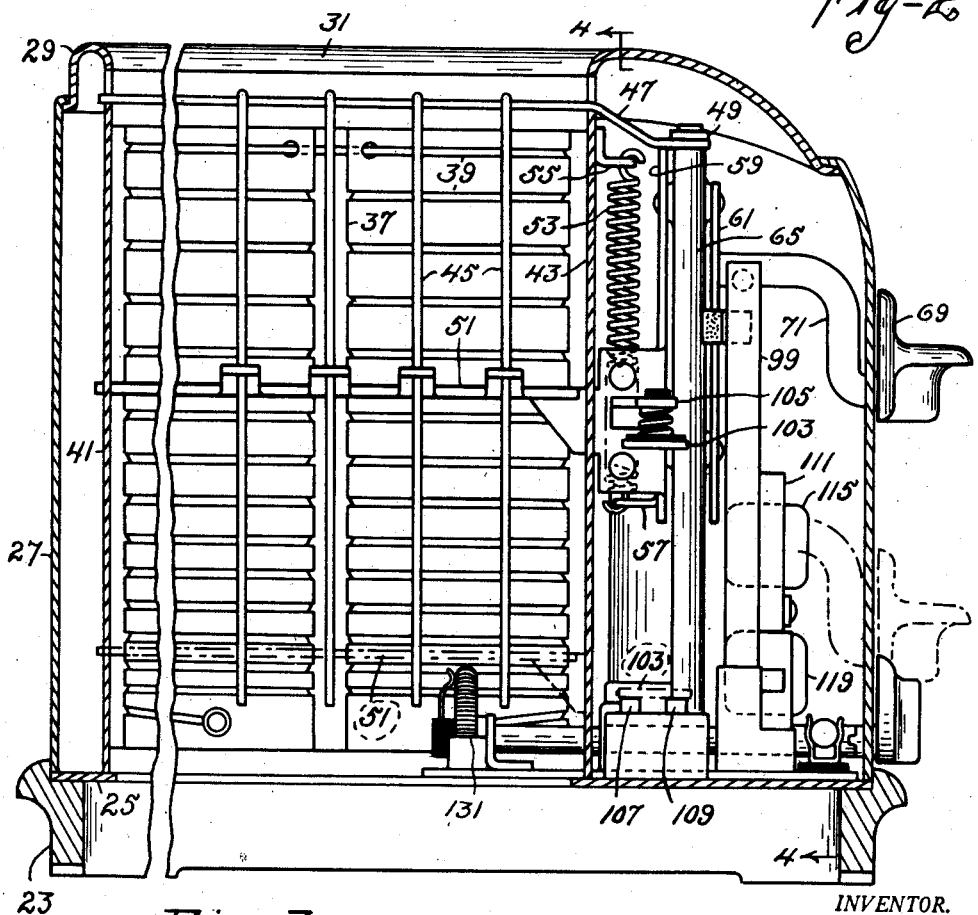
INVENTOR.
BROR G. OLVING

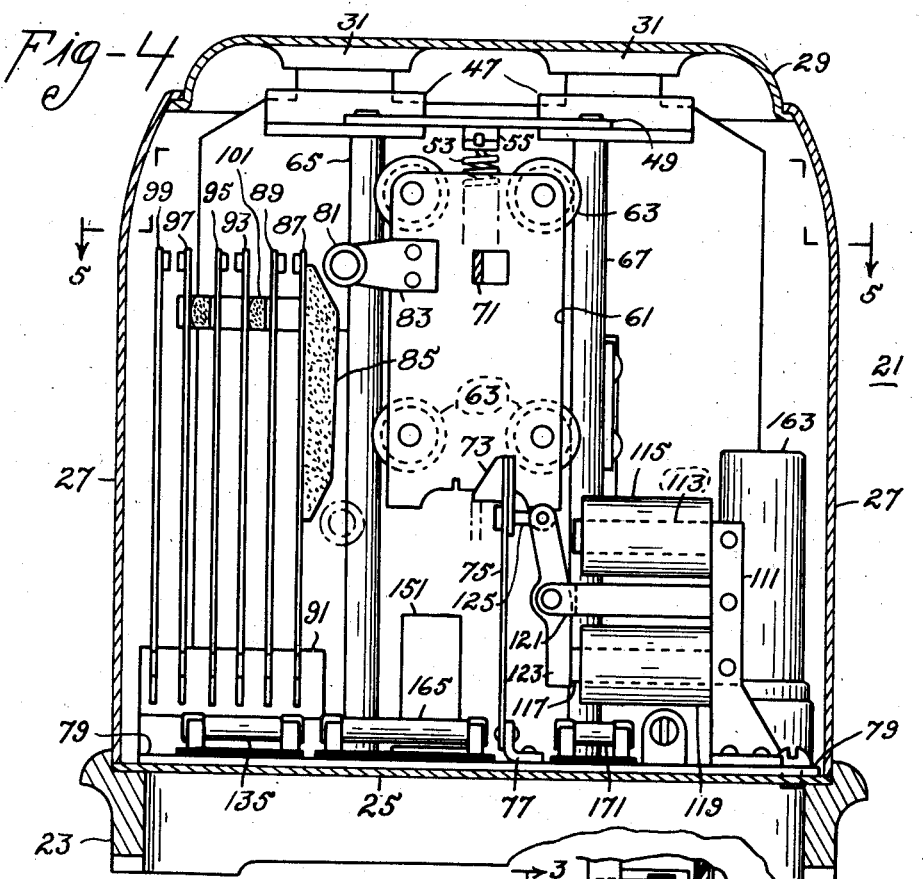
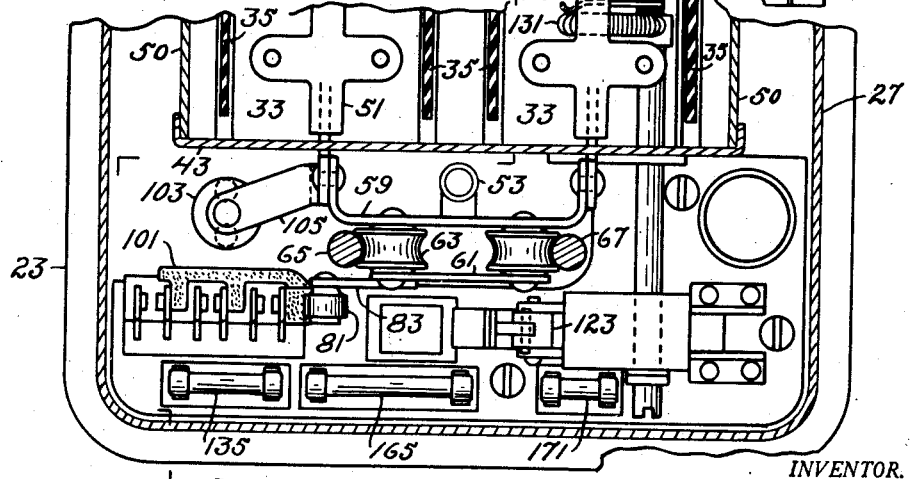

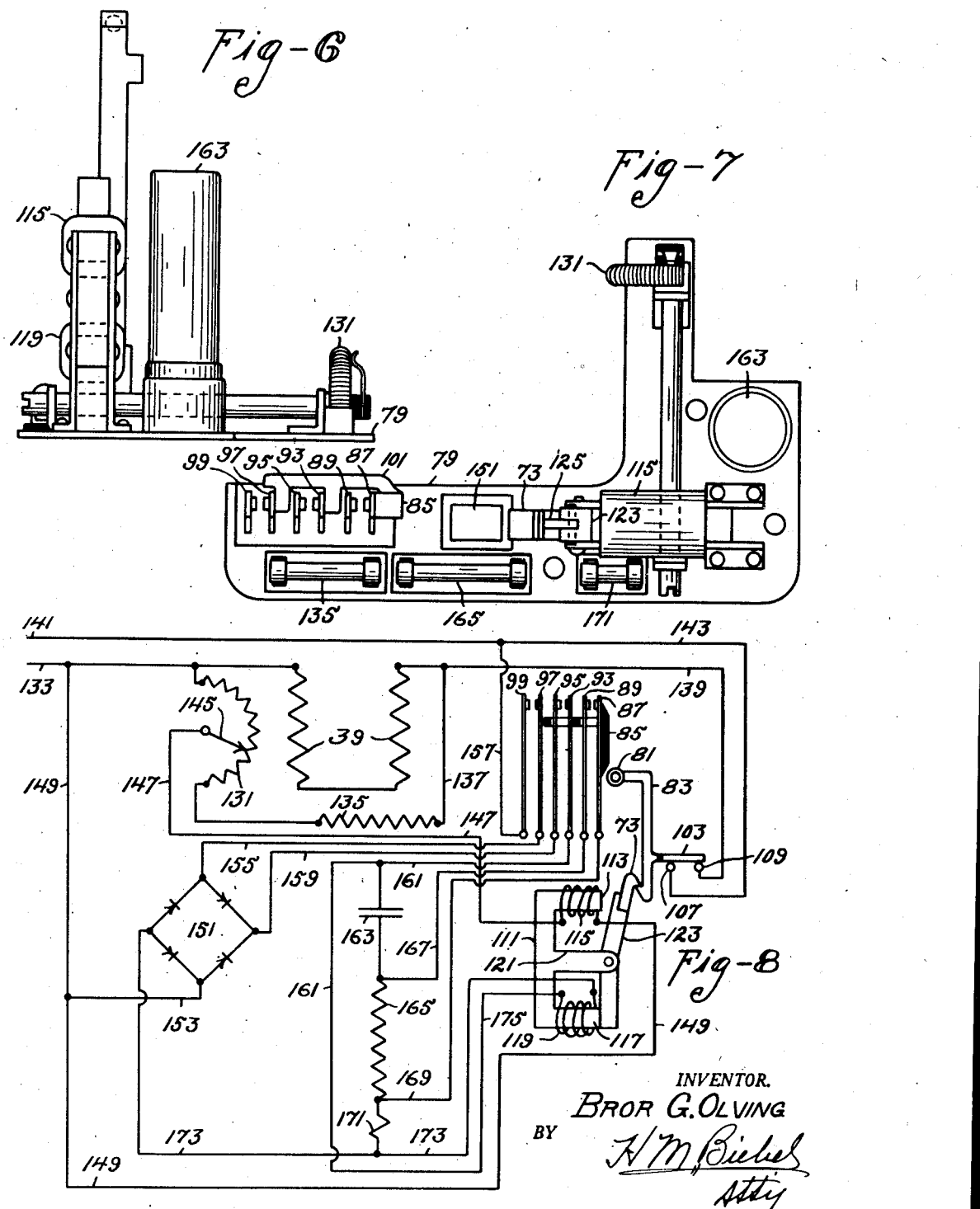

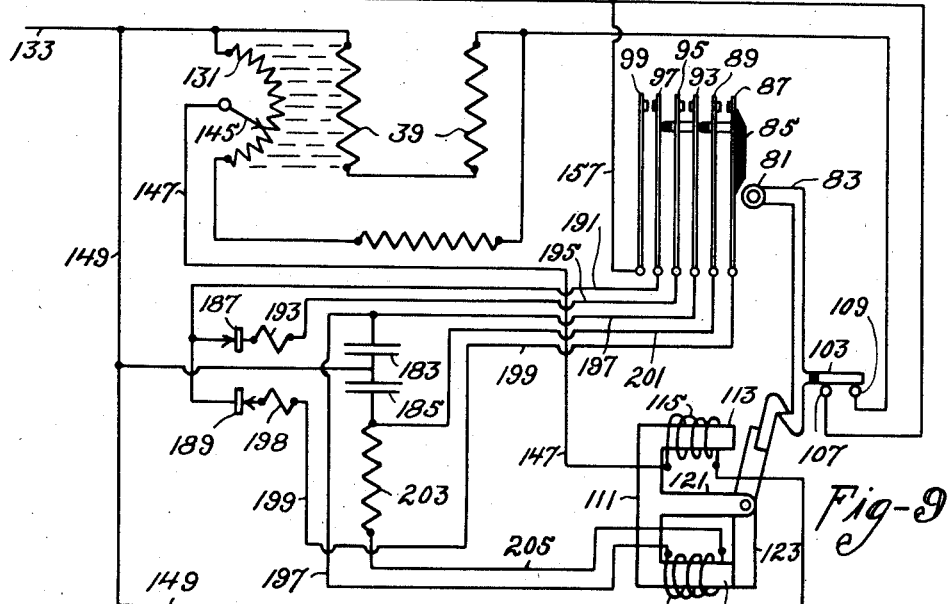

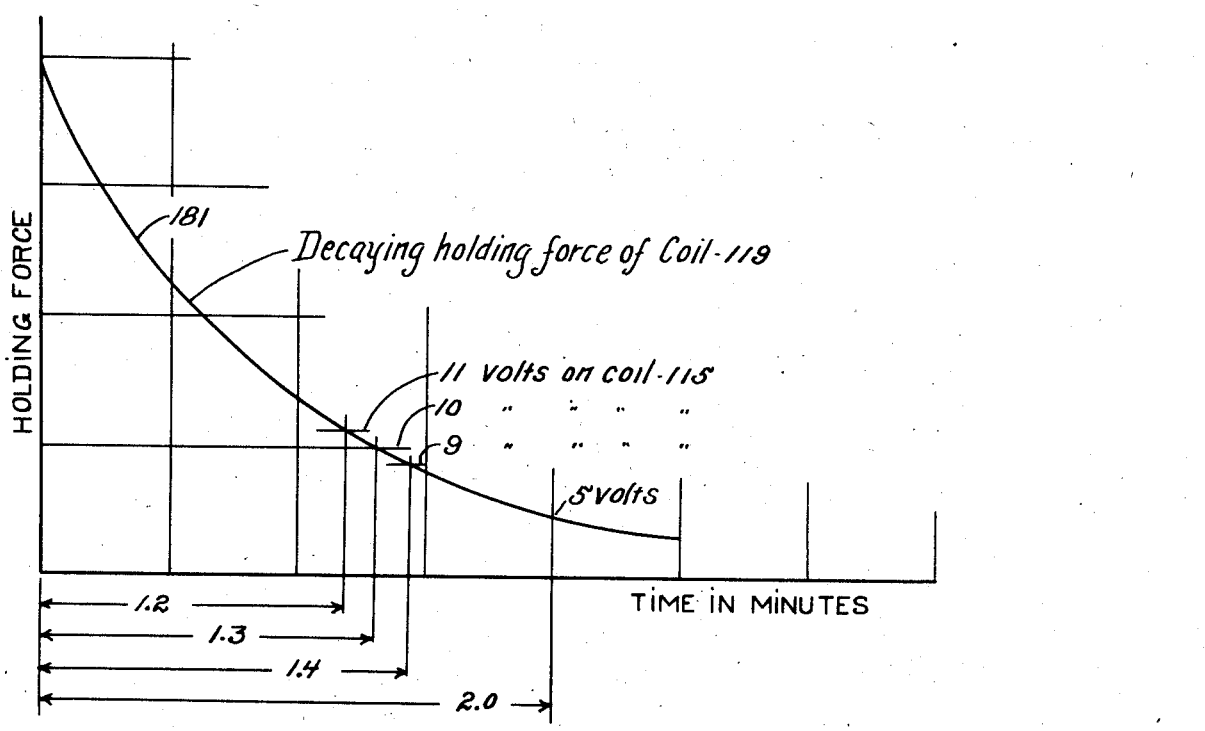

Patented Oct. 19, 1948

2,451,508

UNITED STATES PATENT OFFICE 2,451,508

AUTOMATIC ELECTRIC TOASTER

Bror G. Olving, Elgin, Ill., assignor to McGraw Electric Company, Elgin, Ill., a corporation of Delaware Application November 22, 1944, Serial No. 564,622

3 Claims. (Cl. 219—19)

My invention relates to automatic electric toasters and particularly to electric timing means for such toasters.

An object of my invention is to provide a timing means and an electric circuit therefor, which are dependable and which will stand up in service for long periods of use.

Another object of my invention is to provide a timing means, the performance of which depends upon the inherent electrical characteristics of the component parts, and the operation of which is not dependent on or controlled by any energy supplied from mechanical or thermal storage devices.

Another object of my invention is to provide a timing means and an electric circuit therefor, including an electromagnetic differential relay to obtain the above mentioned performance.

In the drawings,

Figure 1 is a view in side elevation of an electric toaster embodying my invention, Fig. 2 is a view in front elevation thereof, both Figs. 1 and 2 being shown on a reduced scale, Fig. 3 is a longitudinal, vertical, sectional view through a toaster, having associated therewith a timing means embodying my invention, this view being taken on the line 3—3 of Fig. 5, Fig. 4 is a vertical, lateral, sectional view taken on the line 4—4 of Fig. 3, Fig. 5 is a fragmentary, horizontal, sectional view taken on the line 5—5 of Fig. 4, Fig. 6 is an end elevational view of the electric timing element, Fig. 7 is a top plan view of the timing elements, showing the parts mounted as a self-contained unit, Fig. 8 is a diagram of circuits, comprising the elements shown in Fig. 7, Fig. 9 is a modification of the diagram of Fig. 8, Fig. 10 is a modification of the diagrams of Figs. 8 and 9, and, Fig. 11 is a view showing a graph of the values of the voltage, time and holding force for the elements of the timing device shown in Fig. 7.

Referring first of all to Figs. 1 to 5 inclusive, I have there shown a standard two-slice toaster 21, which comprises a base frame 23, which may be preferably made of a molded composition material and which has mounted against its upper surface a preferably metallic base plate 25 and which also supports the body of an outer casing 27, the base plate 25 and the outer casing 27 being held in proper operative position by any means now well known in the art. The casing is further provided with a top cover member 29, which is provided with two longitudinal openings 31 to permit of inserting fresh slices of bread into the toaster and of removing the toasted slices of bread therefrom after a toasting operation.

I provide a pair of toasting chambers 33 in the toaster casing 27, having in each of these chambers a pair of planar toast heating elements 35 comprising one or more sheets of thin electric-insulating material 37, such as mica, on which is wound a strip 39 of a suitable resistance material. The means of and method for holding the planar toast heating elements is old and well known in the art and constitutes no part of my present invention. I provide a rear intermediate wall 41, which may be made of thin sheet metal, and a front intermediate wall 43, which may also be made of metal, and both of which are held in proper operative position by any suitable means. I provide further a plurality of vertically-extending guard wires 45, which are also supported in any manner now well known in the art, as by a plurality of top frame plates 47 extending longitudinally of the toaster. The front end portions of the top frame plates 47 are held in properly spaced positions by a cross bar 49. The toasting chambers are defined by the inner heating element 35, an outer baffle plate 50 and by the front and rear intermediate walls 43 and 41.

I provide a bread carrier 51 in each of the toasting chambers, the rear end portions of which are adapted to extend through slots in the rear intermediate wall 41, while the front portions of the carriers are adapted to extend through slots in the front intermediate wall 43. The carriers are shown in full lines in Fig. 3 in their upper or non-toasting position, from which they may be moved downwardly into the position shown by broken lines which is the lower or toasting position. It is desired to normally yieldingly maintain the carriers in their upper or non-toasting position, and this is effected by a spring 53, the upper end of which is connected to a bracket 55 secured to the front intermediate wall 43, while the lower end thereof is connected to a rearwardly extending lug 57, constituting a part of a rear carriage plate 59, to which the front end portions of the carriers 51 are secured. I provide further a front carriage plate 61 and secure between the front and rear carriage plates four grooved rollers 63, one at each corner of the carriage plates. These rollers are adapted to engage with the inner surfaces of two vertical standards 65 and 67, the lower ends of these standards being held by base plates 25, while the upper ends extend through the front end portions of the top frame plates 47 and of the cross bar 49. This permits of vertical movement of the bread carriers and of the carriage plates from the upper non-toasting position into a lower toasting position, and vice versa.

Means for causing downward movement of the bread carriers is provided by a knob 69 mounted on the forwardly projecting end of a bar 71 which is secured to the front carriage plate 61.

Means for holding the bread carriers in their lower or toasting position, comprises a hook member 73 secured to the top end of a spring bar 75, the lower end of which is secured to a bracket 77 mounted on the upper surface of a plate 79, on which are mounted the parts of a timer to be hereinafter described. The hook member 73 is adapted to engage the bar 71 when the bar has been moved downwardly with the bread carriers.

A roller 81 is rotatably mounted on a short bar 83 secured to the front surface of the front carriage plate 61 at the left hand side thereof. When the bread carriers are moved downwardly, roller 81 is adapted to engage the surface of a cam plate 85 which is secured against one side of a spring contact arm 87, which is biased out of engagement with a cooperating spring contact arm 89. The lower ends of contact arms 87 and 89 are fitted into slots in a block 91 of electric-insulating material, which is also mounted on the upper surface of plate 79. Block 91 has, in addition to the two contact arms 87 and 89, mounted thereon in substantially the same way a second pair of normally disengaged spring contact arms 93 and 95, as well as a third pair of spring contact arms 97 and 99, the use of which will be hereinafter set forth. When roller 81 engages the contact surface of cam plate 85, it causes substantially simultaneous engagement of the pairs of disengaged contact arms by reason of a bar 101 of electric-insulating material having lugs interfitting with contact arms 87, 93, and 97.

I provide a control switch for the toast heating elements, which comprises a contact bridging member 103 insulatedly mounted on a bracket 105 secured to the rear carriage plate 59 and adapted to engage with and be disengaged from a pair of fixed contact members 107 and 109, which are insulatedly mounted on and supported by the base plate 25. When the operator presses downwardly on knob 69 to cause downward movement of the bread carriers, contact bridging member 103 is adapted to engage with the fixed contacts 107 and 109 to cause energization of the toast heating elements.

The timing means constituting my invention comprises a differential relay, which consists of a member 111 of substantially E-shape and is made up of a number of thin sheets of transformer iron punched out to, or built up to, substantially E-shape. The upper leg portion 113 has mounted thereon a coil 115, while the lower leg portion 117 has mounted thereon a coil 119, the two coils being connected, as will be hereinafter set forth. The middle leg 121 is somewhat longer than either the upper or lower leg and has pivotally mounted thereon an armature core 123, which is shown in Fig. 8 as having mounted thereon a hook member 73, but which is shown in Fig. 4 as being connected with hook member 73 by a lost motion connection 125, the resilient supporting bar 75 being normally biased in a clockwise direction. The design, construction, and adjustment of the resilient supporting bar 75 for hook member 73 and the lost motion connection 125 between the spring bar 75 and armature 123 are such that the armature core 123, which is not of straight shape but has two arm portions extending at less than 180° relatively to each other, has its lower arm normally biased, by the bar 75, into engagement with lower leg 117 of the differential relay structure. In this position hook member 73 will be engaged by bar 71 when carriage plate 61 is in its lower toasting position.

Referring now to Fig. 8, I provide a potentiometer 131 which may have a resistance of 100 ohms and which is positioned so as to be either subject to heat from the heating chamber or to heat from the toast heating elements 39. One terminal of potentiometer 131 is connected to an A. C. supply circuit conductor 133, while the other end thereof is connected to one terminal of a resistor 135 having an ohmic resistance on the order of 1000 ohms, the other terminal of which is connected by a conductor 137 to a conductor 139, which connects one terminal of the resistors 39 to fixed contact 109. A second supply circuit conductor 141 is connected by a conductor 143 to the second fixed contact 107.

I provide a manually-adjustable contact arm 145 adapted to engage with any selected point on potentiometer 131, the fixed end of arm 145 being connected by a conductor 147 to one terminal of coil 115, the other terminal of which is connected by a conductor 149 to supply circuit conductor 133. It is therefore evident that when the main switch, comprising contacts 107 and 109 and contact bridging member 103, is closed, a current of adjustably predetermined value will traverse coil 115, as will be hereinafter set forth.

I provide a full-wave dry-type rectifier 151, comprising four individual rectifiers, so connected that each half cycle of an alternating current will be rectified therein. One terminal of the rectifier unit 151 is connected by a conductor 153 to conductor 149 and therefore to the supply circuit conductor 133. The opposite terminal of the rectifier unit is connected by a conductor 155 to contact arm 97, while the cooperating contact arm 99 is connected by a conductor 157 to conductor 143 and therefore to the second supply circuit conductor 141. The contact arms 97 and 99 therefore control the energization of the rectifier unit 151, the two contact arms being moved into engagement with each other during a portion of the downward movement of the bread carriers into toasting position.

The rectified direct current passes say from the right hand corner of the unit through a conductor 159, to contact arm 95; while contact arm 93 is connected by a conductor 161 to one terminal of a timing condenser 163, the other terminal of which is connected to a timing resistor 165. The ohmic resistance of resistor 165 is on the order of 10 megohms, while the capacitance of condenser 163 is on the order of 6 microfarads. The connection between one terminal of condenser 163 and one terminal of resistor 165 is connected by a conductor 167 to contact arm 89, while contact arm 87 is connected by a conductor 169 to the other terminal of resistor 165. A small current limiting resistor 171, having an ohmic resistance on the order of 200 ohms, is connected between one terminal of the timing resistor 165 and a conductor 173, which is connected to the left hand terminal of the unit 151. Conductor 173 is also connected to one terminal of the lower coil 119, while the other terminal of coil 119 is connected by a conductor 175 to conductor 161.

It is therefore evident that when roller 81 engages cam surface 85 during its downward movement and causes engagement of the three cooperating pairs of contact arms hereinbefore mentioned, contact arms 97 and 99 will cause energization of the four dry-type rectifier units 151; contact arms 93 and 95 will cause energization of the timing condenser 163 by the dry-type rectifier unit 151; while contact arms 87 and 89 cause short circuiting of the timing resistor 165. The length of the cam surface 85 is made sufficient so that full charging of the condenser 163 is effected, and assuming a source of supply of alternating current on the order of 115 volts condenser 163 will be charged to a voltage on the order of 150 volts.

Since the three pairs of contact arms, caused to engage by the engagement of roller 81 with cam surface 85, are disengaged as soon as the bread carriers have been moved into their toasting position, the toasting operation will be started with a fully charged condenser 163, which then discharges through the timing resistor 165, the resistor 171, as well as through coil 119. The rate of decay of this current is according to a well known law and may be varied, for a given initial voltage of condenser 163, by variation in the total resistance through which it discharges.

As has already been hereinbefore stated, the coil 115 carries a substantially constant current, determined by the position of movable contact arm 145, and the value of this current is such that it will be impossible to cause movement of the armature core 123 during the time of the initial part of a toasting operation, when the current through coil 119 is relatively large. Since the air gap between the lower leg 117 and the lower arm of armature core 123 is substantially zero, that is these two are in engagement with each other, the current through coil 115 must be relatively large in order to provide a sufficient attractive force to attract armature 123, because its effect is decreased by reason of the air gap between the upper leg 113 and the armature core 123. By proper correlation of the value of the voltage applied to the four dry-type rectifiers 151 and of the other elements of the control system represented by Fig. 8, it will require on the order of two and one-half to three minutes before the current traversing coil 119 and provided by the condenser 163 becomes too small to be able to hold hook member 73 in engagement with bar 71, and as soon as coil 115 causes a pivotal movement of armature core 123 in a clockwise direction, as seen in Fig. 4 of the drawings, hook member 73 will be disengaged from bar 71, with resultant quick upward movement of the bread carriers into non-toasting position.

The resistor 131 of the potentiometer has a high positive temperature coefficient of resistance, such as is provided by a nickel iron wire. Resistor 135 is made from wire having a substantially zero temperature coefficient of resistance, and the resistance of resistor 135 is made larger than the resistance of potentiometer 131, so that a small increase in temperature of the potentiometer will result in a relatively large increase in voltage across coil 115. If it be assumed that the position of contact arm 145 is that which will result in medium toast, it is only necessary to turn arm 145 in a counter-clockwise direction to cause an increase in the duration of a toasting operation, with attendant increase in the color of the resulting toast, from say medium to dark. Conversely, it is only necessary to cause turning movement of contact arm 145 in a clockwise direction to cause decrease in the length of time of a toasting operation and resultant light instead of medium toast.

Since a change in temperature of the toaster results because of immediate succeeding toasting operations, with attendant darkening of the color of the toast, if the length of the toasting cycle remained constant, this condition also is taken care of by the fact that the resistance of potentiometer 131 has a positive temperature coefficient of resistance which increases the voltage drop across that part of potentiometer 131 effective to provide a voltage for the current traversing coil 115. Therefore, since the current through coil 115 becomes larger with increase of temperature of the toaster, and therefore of the potentiometer 131, the current traversing coil 119 does not have to decay to as low a value as would otherwise be the case, before the magnetomotive force of coil 115 is sufficient to attract the armature core 123 and cause termination of the toasting operation.

This is shown, for instance, in Fig. 11 of the drawings by curve 181, which curve shows the decay in the holding force of coil 119 expressed in terms of the voltage, the pull of coil 115 being proportional to the square of the voltage. Thus it will take on the order of two minutes for the voltage to decrease to 5 volts, 1.4 minutes to decrease to 9 volts, 1.3 minutes to decrease to 10 volts, and 1.2 minutes to decrease to 11 volts; so that the duration of a toasting operation with increased temperature will be in substantially the proportion indicated, with the result that when these elements are properly correlated, substantially uniform toasting of successive slices of bread will be obtained.

Referring now to Fig. 9 of the drawings, I have there illustrated a modification of the diagram of Fig. 8 of the drawings, in which I provide a diagram of connections making it possible to charge two condensers to almost twice the voltage obtained by the diagram of Fig. 8, assuming the same value of supply circuit voltage in both cases, this permitting of obtaining a longer time delay, if desired or necessary. I provide two timing condensers 183 and 185 which are adapted to be energized by two individual half-wave dry-type rectifiers 187 and 189. In this diagram the first cooperating pair of contact arms 99 and 97 close the circuit to the two rectifiers through conductors 157 and 191. The other terminal of rectifier 187 is connected through a resistor 193 having an ohmic resistance on the order of 200 ohms, the other terminal of resistor 193 being connected by a conductor 195 to contact arm 95, while contact arm 93 is connected by a conductor 197 to one terminal of the first timing condenser 183 and to one terminal of coil 119. The other terminal of the second rectifier 189 is connected to one terminal of a resistor 198 having an ohmic resistance on the order of 200 ohms, the other terminal of which is connected by a conductor 199 to contact arm 87, while contact arm 89 is connected by a conductor 201 to the second terminal of the second timing condenser 185 and to one terminal of a timing resistor 203 which has an ohmic resistance on the order of 10 megohms.

The other terminal of timing resistor 203 is connected by a conductor 205 to the other terminal of coil 119.

The two timing condensers 183 and 185 are charged in inverted parallel relationship but cooperate to be discharged in series through timing resistor 203 and coil 119. Substantially the same comments as made hereinbefore in connection with the diagram of Fig. 8 apply also to Fig. 9.

In cases where it is desired to operate a toaster of this construction and provided with a timing circuit of the general kind hereinbefore described is to be used on relatively low voltage, the connections shown in Fig. 10 of the drawings will be further useful. I provide a small radio-type transformer comprising a primary coil 211, a secondary coil 213, and a laminated iron core 215. One terminal of primary coil 211 is connected to conductor 149, while the other terminal is connected by a conductor 217 with contact arm 97, so that upon engagement of contact arm 97 with contact arm 99, the secondary winding 213 of the transformer will be energized and will energize a half-wave dry-type rectifier unit 151 having four rectifiers. The rectified D. C. voltage is connected, when contact arms 95 and 93 are in engagement with each other, to a timing condenser 163, while a timing resistor 165 is short circuited by engagement of the contact arms 87 and 89 during the time that roller 81 is in engagement with cam surface 85.

When a comparatively long time delay is desired and the timing resistor 165 is made very large, the current passing through coil 115 is very small, and sufficient energy is not available for satisfactory operating conditions of the detent mechanism; and I therefore provide a second electromagnetic latch release control by the electromagnetic differential detail hereinbefore described. Instead of directly operating the hook member 73, I connect a contact bridging member 219 to the upper arm of core 123, which, when core 123 is moved by coil 115, causes engagement of the contact bridging member 219 with fixed contacts 221 and 223 to thereby close a circuit through a coil 225 adapted to energize a mechanical core 227 of the actual detent release means. Contact 223 is connected by a conductor 229 with conductor 149, while contact 221 is connected to one terminal of coil 225, the other terminal of which is connected by a conductor 231 to fixed contact 109, which is connected by a conductor 139 to the other terminal of the toast heating elements 39. When contact bridging member 219 is caused to engage contacts 221 and 223, an energizing circuit is established through coil 225 from the supply circuit conductors 133 and 141, with attendant release of the bread carriers from the latch 73 and quick upward movement thereof into non-toasting position.

The same comments made hereinbefore in connection with compensation for changes of temperature of the toaster structure, so well as the desire of the operator for different degrees of toasting, apply equally well to the connections shown in Fig. 10, so that they will not be repeated here.

Variations in the voltage of the supply will also be taken care of to provide substantially the same degree of toasting desired. Thus, if the voltage of the supply circuit should be raised, the temperature of the heating elements 39 will also be increased to thereby cause greater toasting of a slice of bread in a given length of a toasting operation; but compensator 131 will also be heated to a higher temperature, with attendant increase in voltage applied to coil 115 of the differential relay, so that the holding force of coil 119 need not fall to as low a value to cause release of the latch and termination of a toasting operation. The converse conditions are present in case of decrease of the supply circuit voltage.

It is therefore evident that the three diagrams of connections shown in Figs. 8, 9, and 10 disclose systems of timing for say an electric toaster, which is effective to provide an electromagnetic differential having two coils, one of which is traversed by a substantially constant, but adjustably variable current, while the other coil is traversed by an initially large current, decaying with time; and when the holding effect of the second coil is over-balanced or over-powered by the first coil, release of the holding means for the bread carriers is effected, with quick upward movement thereof into non-toasting position.

Various other modifications may be made in the systems embodying my invention without departing from the spirit and scope thereof, and all such modifications clearly covered by the appended claims shall be considered a part of my invention.

I claim as my invention:

1. In an automatic electric toaster the combination with electric toast heating elements, a control switch for said heating elements biased to open position, movable means to cause closing of said switch to start a toasting operation and a latch to hold the switch in closed position, of means for terminating a toasting operation, comprising an electromagnetic differential relay having two oppositely acting coils for controlling said latch, means for energizing one coil with a current of substantially constant value comprising an adjustable potentiometer connected to the terminals of the heating elements and means for energizing the other coil by an initially large and then decaying current comprising at least one pair of half-wave dry-disc type rectifiers, a timing condenser, a timing resistor connected in series circuit with said timing condenser, means to energize said rectifiers momentarily during the movement of said movable means to fully charge said condenser, the condenser then discharging through said timing resistor and said other coil with an initially large and then decaying current, termination of a toasting operation and release of said latch occurring when the current traversing said other coil has reached a predetermined low value, said potentiometer having a positive temperature coefficient of resistance and being subject to heat from the toast heating elements to ensure that successively toasted slices of bread shall be uniformly toasted, irrespective of changes of temperature of the toaster.

2. In an automatic electric toaster the combination with electric toast heating elements adapted to be energized from an A. C. supply circuit, a switch for controlling said heating elements biased to open position, a movable member to cause closing of said switch to start a toasting operation and a latch for holding said switch in closed position, of means for terminating a toasting operation comprising an electromagnetic differential relay having two oppositely acting coils for controlling said latch, means for energizing one coil with an A. C. current of substantially fixed value comprising an adjustable potentiometer connected to said A. C. circuit and means for energizing the other coil by an initially large and then decaying direct current comprising a full-wave dry-disc type rectifier, a timing condenser, a timing resistor connected in series circuit with said timing condenser, means to energize said rectifiers momentarily during the movement of said movable member to fully charge the condenser, means to then cause discharge of the condenser through said timing resistor and said other coil with an initially large and then decaying current to cause release of said latch when the current traversing said other coil reaches a predetermined value, said adjustable potentiometer having a positive temperature coefficient of resistance and being subject to heat from the toast heating elements to ensure that slices of bread toasted in quick succession shall be uniformly toasted, irrespective of changes of temperature of the toaster.

3. In an automatic electric toaster the combination with electric toast heating elements adapted to be energized from an A. C. supply circuit, a switch for controlling said heating elements biased to open position, a movable member to cause closing of said switch to start a toasting operation and a latch for holding said switch in closed position, of means for terminating a toasting operation comprising an electromagnetic differential relay having two oppositely acting coils for controlling said latch, means for energizing one coil with an A. C. current of substantially fixed value comprising an adjustable potentiometer connected to said A. C. circuit and means for energizing the other coil by an initially large and then decaying direct current comprising a full-wave dry-disc type rectifier, a timing condenser, a timing resistor connected in series circuit with said timing condenser, means to energize said rectifiers momentarily during the movement of said movable member to fully charge the condenser, means to then cause discharge of the condenser through said timing resistor and said other coil with an initially large and then decaying current to cause release of said latch when the current traversing said other coil reaches a predetermined value, said adjustable potentiometer having a positive temperature coefficient of resistance and being subject to heat from the toast heating elements to ensure that successive slices of bread shall be toasted uniformly, irrespective of different voltages of the supply circuit.

BROR G. OLVING.

REFERENCES CITED

The following references are of record in the file of this patent:

UNITED STATES PATENTS

| Number | Name | Date |
|---|---|---|
| 2,061,011 | Vingerhoets | Nov. 17, 1936 |
| 2,207,946 | Sardeson | July 16, 1940 |
| 2,317,228 | Shroyer | Apr. 20, 1943 |
| 2,364,998 | Palmer et al. | Dec. 12, 1944 |

Certificate of Correction

Patent No. 2,451,508.  October 19, 1948.

BROR G. OLVING

It is hereby certified that errors appear in the printed specification of the above numbered patent requiring correction as follows:

Column 7, line 61, after "supply" insert *circuit*; line 67, strike out "op-"; and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*